(12) United States Patent
Haseyama

(10) Patent No.: US 6,191,634 B1
(45) Date of Patent: *Feb. 20, 2001

(54) DATA COMMUNICATIONS SYSTEM AND INTERFACE APPARATUS FOR DATA COMMUNICATIONS

(75) Inventor: Hiroyasu Haseyama, Hamura (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/144,477

(22) Filed: Aug. 31, 1998

(30) Foreign Application Priority Data

Sep. 1, 1997 (JP) .................................... 9-236074

(51) Int. Cl.[7] ............................................. G06F 13/00
(52) U.S. Cl. ........................ 327/333; 709/253; 709/249; 326/68
(58) Field of Search .................. 709/253, 204, 709/227, 230, 232, 249; 327/333; 326/62, 68, 75

(56) References Cited

U.S. PATENT DOCUMENTS 5,157,769 * 10/1992 Eppley et al. .................. 709/253
5,504,864 4/1996 Berg .................................... 709/253

* cited by examiner

Primary Examiner—Tuan T. Lam
(74) Attorney, Agent, or Firm—Frishauf, Holtz, Goodman, Langer & Chick, P.C.

(57) ABSTRACT

A data communication interface between a high-power device and a low-power device enabling wherein a cable having connectors at its both ends connects the high-power device and the low-power device; and the low-power device has its own incorporated level conversion circuit and drives same with a voltage which is supplied as a source voltage for the low-power device. The circuit receives a data signal at voltage levels compatible with the high-power device. The circuit converts the received signal into a data signal which is acceptable by the low-power device. The circuit receives from the low-power device a data signal at voltage levels compatible with the low-power device, and also converts the received signal into a signal which is acceptable by the high-power device. The level conversion circuit needs no element, such as a zener diode, for lowering (clamping) a voltage because the circuit is powered by the low-power device. The circuit can be miniaturized by thus excluding such a clamp element, and the connectors are also miniaturized because the low-power device incorporates the level conversion circuit therein.

4 Claims, 5 Drawing Sheets

DATA COMMUNICATIONS SYSTEM AND INTERFACE APPARATUS FOR DATA COMMUNICATIONS

BACKGROUND OF THE INVENTION

1. Field of the Invention

The present invention relates to an interface apparatus for data communications between a high-power device and a low-power device, and a data communications system using the interface apparatus.

2. Description of the Related Art

U.S. Pat. No. 5,504,864 discloses the structure for data communications between a high-power device such as a desktop computer (desktop PC) and a low-power device such as a hand-held computer (hand-held PC) via pins 2 and 3 in RS-232C connectors.

FIG. 4 illustrates connecting a desktop PC 102 to a hand-held PC 104 via a communications interface apparatus 100 having a cable 110 and connectors 112, 114 in accordance with a data transmitting system disclosed in U.S. Pat. No. 5,504,864. Reference numerals 106 and 108 respectively denote serial ports of the desktop PC 102 and the hand-held PC 104. A level conversion circuit 116 is housed in the connector 114 that enables voltage level conversion between the desktop PC 102 and the hand-held PC 104.

FIG. 5 is a circuit diagram of the communications interface apparatus 100. To transfer data from the desktop PC 102 to the hand-held PC 104, the level conversion circuit 116 includes an NPN transistor Q1 with its base being connected to a TxD pin of the connector 112 through a resistor R1 as well as to a ground pin GND of the connector 112 through a resistor R2.

The collector of the transistor Q1 is connected to a receive contact RX on the connector 114. The emitter of the transistor Q1 is connected to the ground GND on the connector 112 through a resistor R3 and is directly connected to a ground pin GND on the connector 114.

To transfer data from the hand-held PC 104 to the desktop PC 102, the level conversion circuit 116 comprises a field-effect transistor (FET) Q2, a zener diode D1 and a resistor R5. A receive contact RxD of the connector 112 is connected to a negative voltage source RTS (−12 volts) through the resistor. The gate of the FET Q2 is connected to a transmit contact TX of the connector 114 through a resistor R6 and to the ground pin GND on the connector 112 through a zener diode D2.

The anode of the diode D1 is directly connected to the ground pin GND of the connector 112, and to the ground pin GND of the connector 114 through the resistor R3. The cathode of the diode D2 is connected to the gate of the transistor Q2. The drain of the transistor Q2 is connected to a receive contact RxD of the connector 112 through a resistor R7.

A level converting operation for data transmission from the desktop PC 102 to the hand-held PC 104 via the cable 110 will now be described.

The receive contact RX on the connector 114 is kept high (5 volts) internally by the hand-held PC 104. The TxD line of the connector 112 is low and the transistor Q1 is in an off state when the desktop PC 102 is sending a logical zero (−12 volts). In this instance, transistor Q1 is an "open-collector," and thus has no effect on the receive contact RX of the connector 114, that is, the voltage at the receive contact RX is kept at 5 volts.

Conversely, when a logical one (+12 volts) is being transmitted from the desktop PC 102, the TxD line becomes high and turning transistor Q1 "on", thus, pulling the receive contact RX on the connector 112 to the ground GND (0 volt).

The level conversion for data transmission from the hand-held PC 104 to the desktop PC 102 via the cable 110 will now be described.

The diode D1 sets the threshold for turning Q2 on and off by clamping he positive voltage source DTR (+12 volts) of the connector 112 to approximately 5.1 volts. The potential at the gate of the FET Q2 will be around 3–5 volts, and the FET Q2 will be in an off state when the transmit contact TX of the connector 114 is high (+5 volts). Thus, there is no current flowing between the source and drain, and the receive contact RxD of the connector 112 will continue to be pulled low (−12 volts) by the negative voltage source RTS (−12 volts) of the connector 112.

When the transmit contact TX of the connector 114 goes low (0 volt), the FET Q2 turns on, and the receive contact RxD of the connector 112 is connected to the clamped positive voltage source DTR (+12 volts), pulling RxD to a high state.

The level conversion circuit of the above conventional communications interface apparatus, however, has a large circuitry because it requires the zener diodes and the like. The circuit is powered by the high-power device, therefore, those diodes are necessary for pulling (clamping) the supplied relatively high voltage to a predetermined low voltage corresponding to the low-power device by lowering the threshold for switching the gate of the FET. The clamping by the diodes is necessary for correct switching of the FET in accordance with a signal from the low-power device.

Moreover, the cable needs a large connector because the level conversion circuit is housed in the connector. Such the a cable, moreover, has a high manufacturing cost and is inconvenient for handling.

SUMMARY OF THE INVENTION

The present invention has been made in consideration of the above. It is an object of the present invention to provide a data communications system and a data communications interface apparatus having a smaller conversion circuit and connector with and a reduce manufacturing cost.

To accomplish the above object, a data communications interface apparatus connects a high-power device and a low-power device with a cable. The low-power device has its own incorporated signal level conversion circuit which is powered by the low-power device.

The signal level conversion circuit has a first element. The first element is turned on when it receives a low level signal (0 volt) from the low-power device and is turned off when it receives a high level signal (5 volts).

The low-power device supplies a signal having a voltage corresponding to the low-power device (5 volts) to the high power device by applying a current thereto through the turned-on first switching element.

When the first switching element is turned off, a voltage pulled down to negative voltage level (−12 volts) is supplied to the high-power device through an open-circuit between the first switching element and the high-power device.

The signal level conversion circuit further comprises a second switching element. The second switching element is turned on when it receives a signal having one level (+12 volts) from the high-power device, and is turned off when receiving a signal having the other level (−12 volts).

A ground level signal (0 volt) is supplied to the low-power device by applying a current between the low-power device and the ground through the turned-on second switching element.

When the second switching element is turned off, a voltage which is pulled up so as to correspond to voltage level of the low-power device (5 volts) is supplied to the low-power device through an open-circuit between the second switching element and the low-power device.

The level conversion circuit according to the present invention is incorporated in the low-power device and powered thereby with a low voltage. Therefore, the level conversion circuit does not require elements such as a zener diode. Those elements are required in a conventional apparatus for pulling (clamping) a voltage of the high-power device to a predetermined lower voltage by lowering the gate threshold for correct switching in accordance with a signal from the low-power device. Such exclusion of the diodes realizes miniaturization of the level conversion circuit and reduces the manufacturing cost.

The present invention can also miniaturize a connector because the connector needs no circuits or substrates housed therein. And this also causes the reduction of the manufacturing cost.

DETAILED DESCRIPTION OF THE PREFERRED EMBODIMENT

A data communications system and a data communications interface apparatus according to one embodiment of the present invention will now be described in detail with respect to accompanying drawings.

Figure 1:
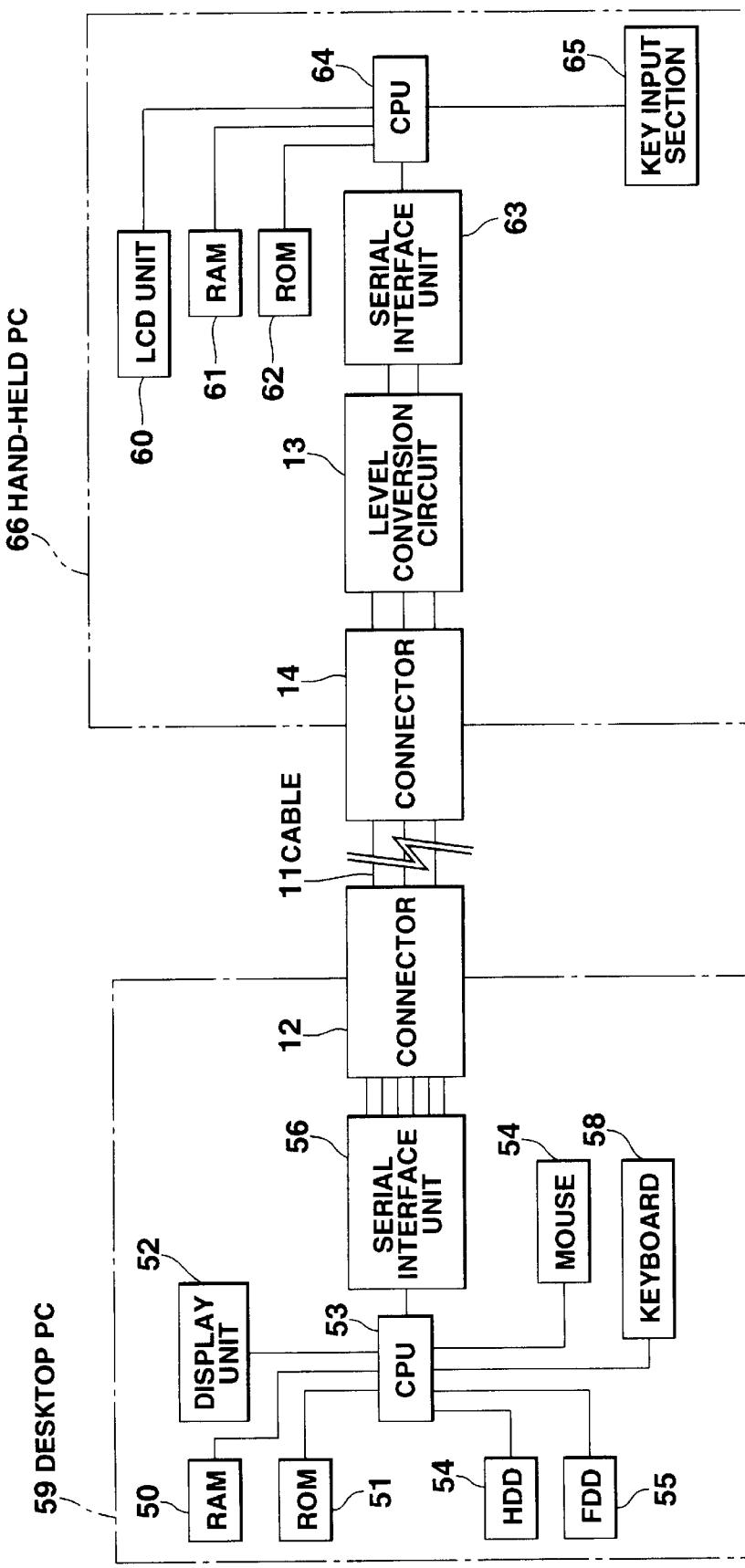
FIG. 1 is a block diagram showing the structure of a data communications system according to one embodiment of the present invention.

FIG. 1 shows the structure of a data communications system according to this embodiment. A cable 11 having RS-232C connectors 12 and 14 at its both ends connects a desktop personal computer (desktop PC) 59 and a hand-held personal computer (hand-held PC) 66. The desktop PC 59 comprises a RAM 50, a ROM 51, a display unit 52, a CPU 53, a hard disk drive 54, a floppy disk drive 55, a serial interface unit 56, a mouse 57, and a keyboard 58. The hand-held PC 66 comprises a liquid crystal display (LCD) unit 60, a RAM 61, a ROM 62, a serial interface unit 63, a CPU 64, and a key input section 65. Further, a later described level conversion circuit 13 is incorporated therein.

Figure 2:
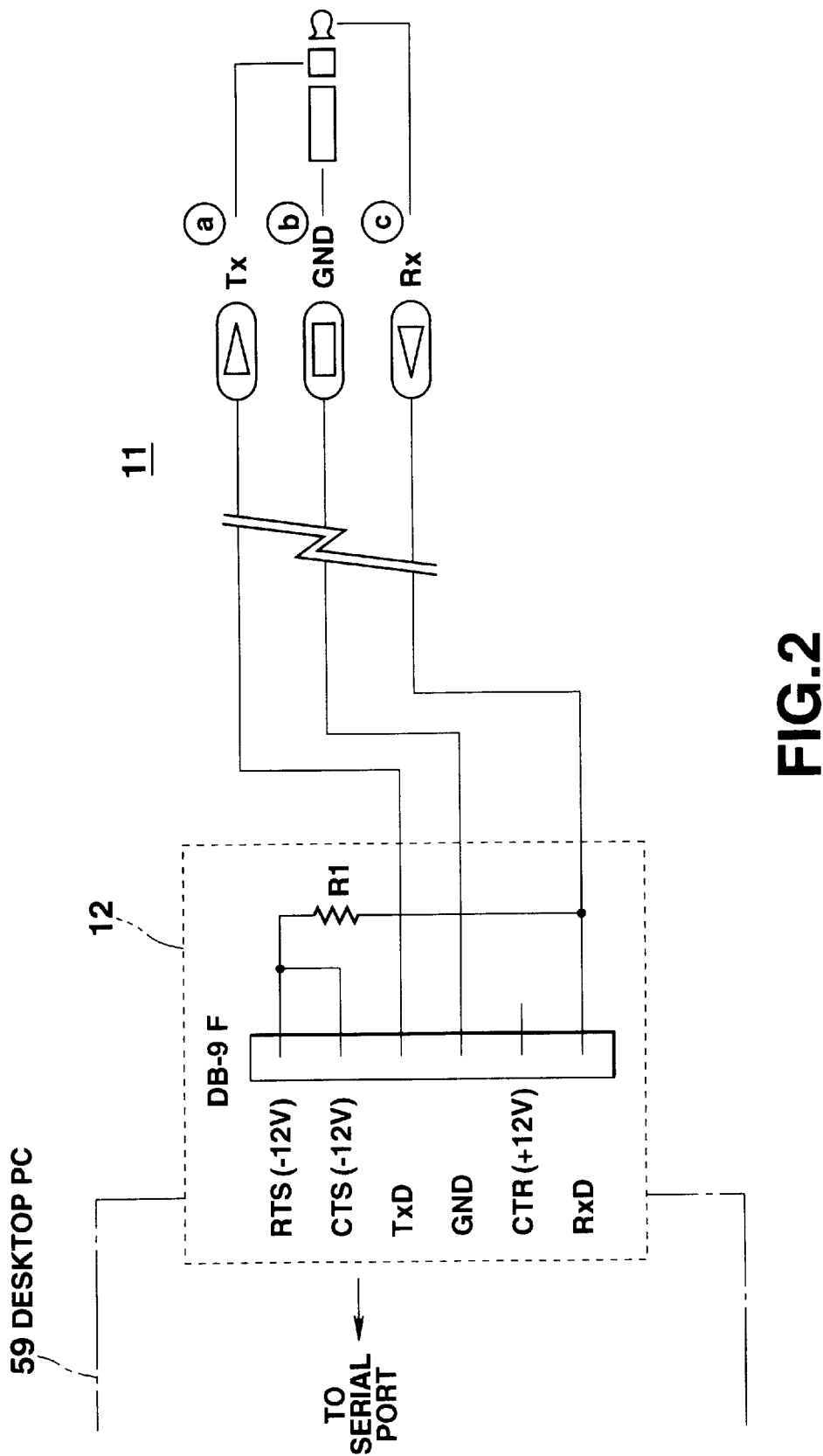
FIG. 2 is a diagram showing the internal structure of a connector and a cable connected to a serial port of a desktop PC, employed in a data communications interface apparatus according to one embodiment of the present invention.
Figure 3:
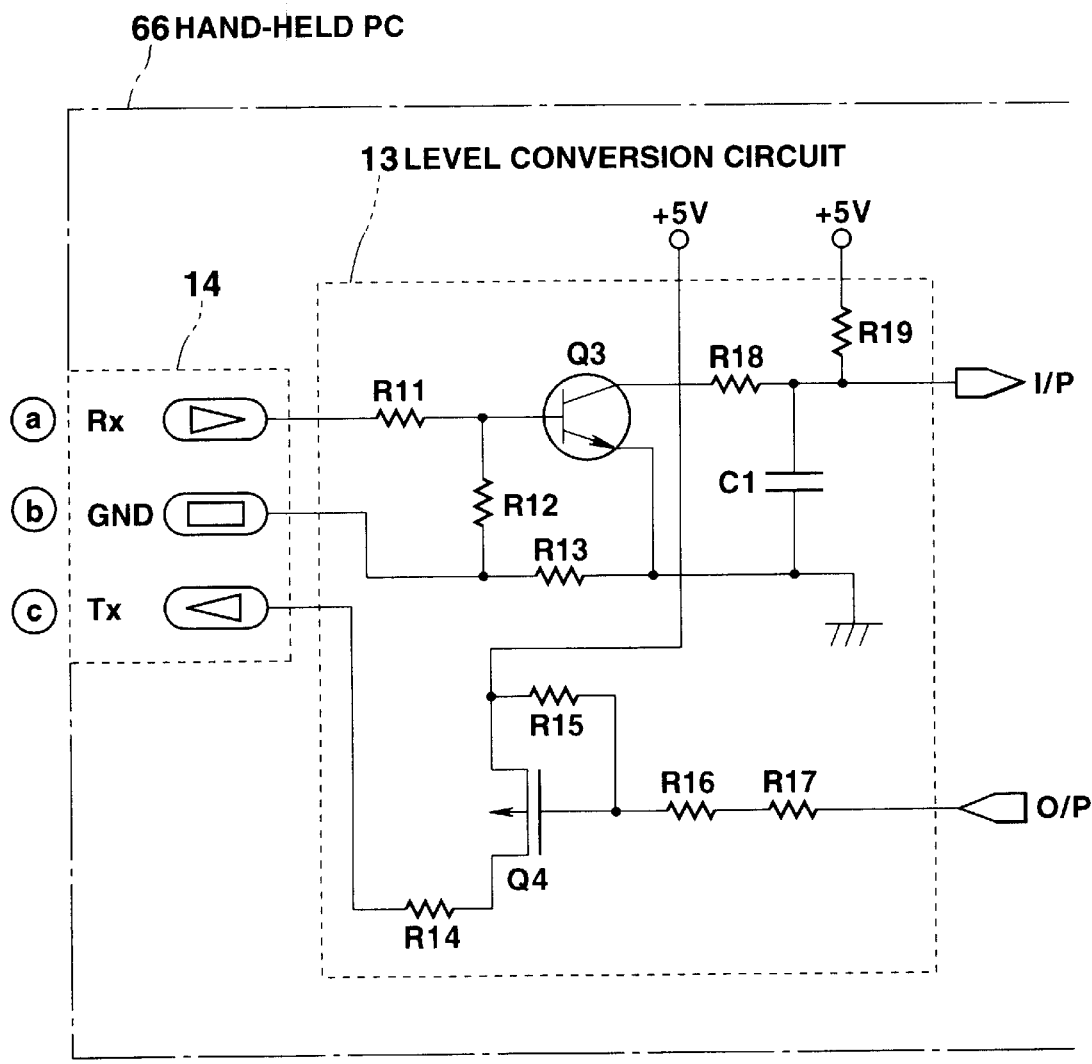
FIG. 3 is a diagram showing the structure of a level conversion circuit incorporated in a hand-held PC, employed in a data communications interface apparatus according to one embodiment of the present invention.
Figure 4:
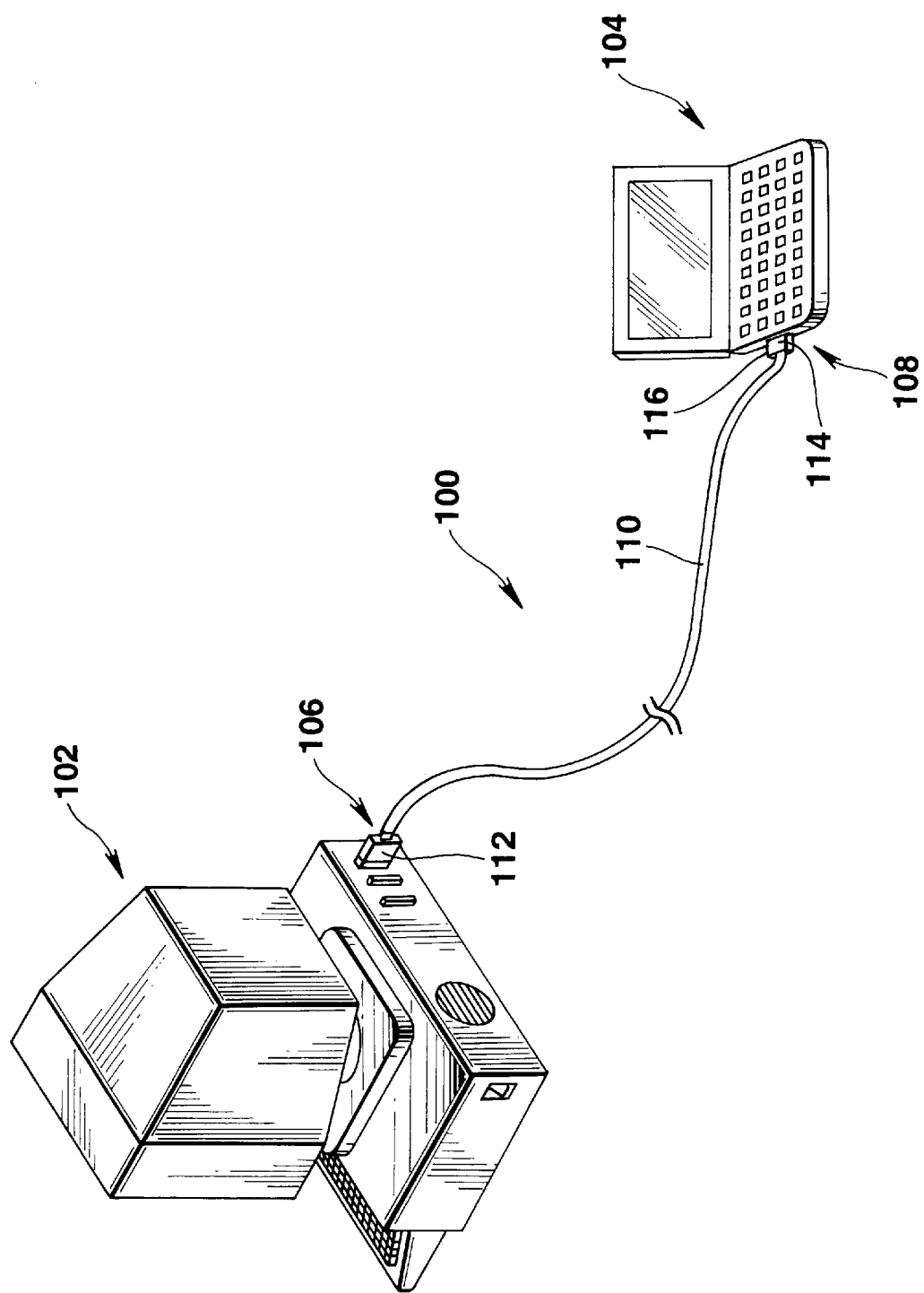
FIG. 4 is a diagram illustrating a conventional communications interface apparatus connecting a desktop PC to a hand-held PC.
Figure 5:
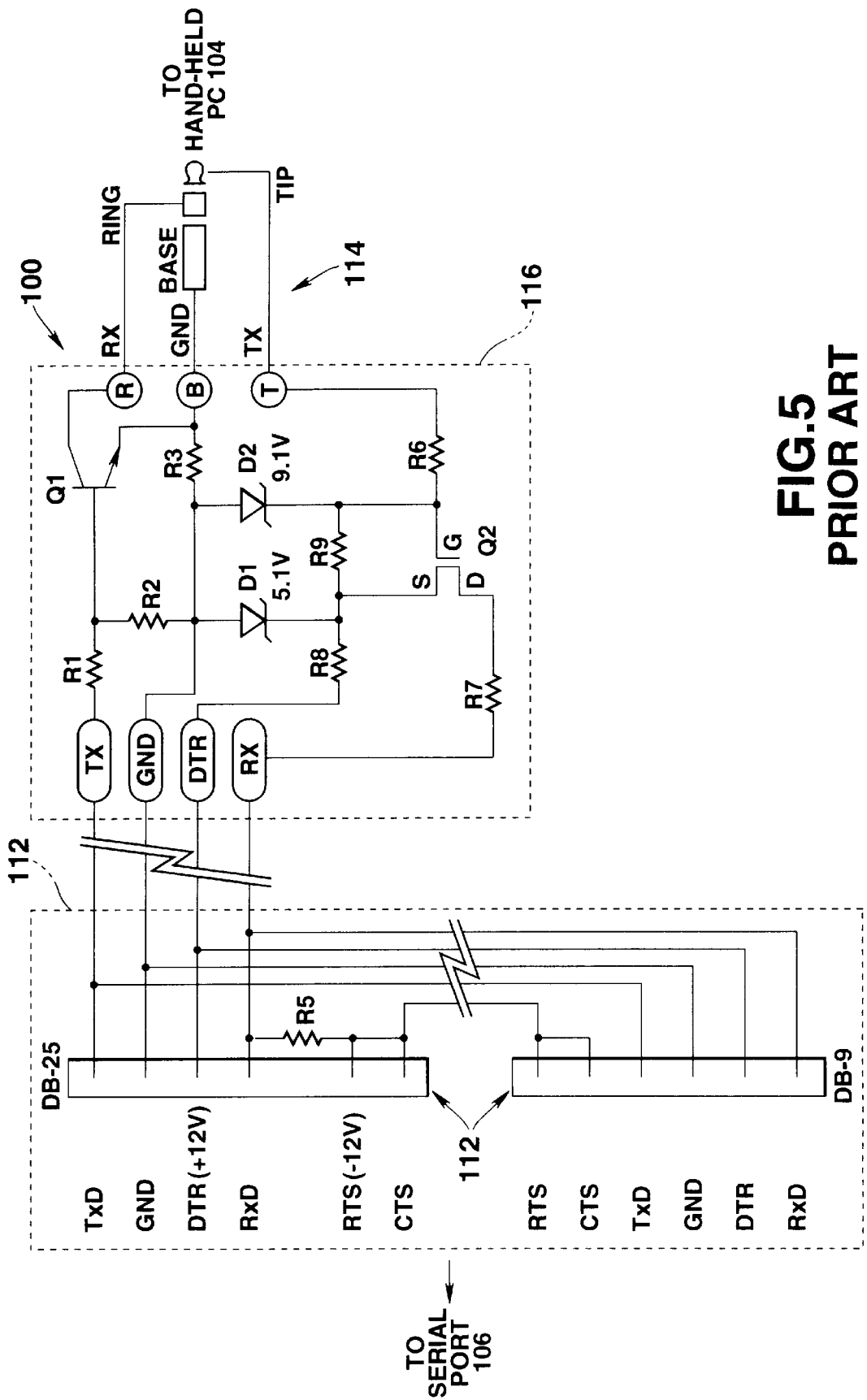
FIG. 5 is a diagram illustrating the internal structure of a conventional communications interface apparatus.

FIGS. 2 and 3 show the structure of data communications interface apparatus between the desktop PC 59 and the hand-held PC 66. FIG. 2 especially shows the internal structures of the cable 11 and the connector 12 to be connected to the serial port of the desktop PC 59. FIG. 3 especially shows the level conversion circuit 13 and the connector 14 being incorporated in the hand-held PC 66.

In FIG. 2, the cable 1 1 has the connector 12 at one end. A transmit pin TxD of the connector 12 is connected to a transmit terminal Tx provided at the other end of the cable 11. A receive pin RxD is connected to negative voltage source pins RTS (−12 volts) and CTS (−12 volts) through a resistor R1 (pull-down resistor R1) which is provided for pulling a voltage down. The receive pin RxD is also connected to a receive terminal Rx provided at the other end of the cable 11. A ground pin GND in the connector 12 is connected to a ground terminal GND provided at the other end of the cable 11. A positive voltage source pin DTR (+12 volts) is a resting pin.

In FIG. 3, the level conversion circuit incorporated in the hand-held PC 66 has the connector 14 comprising a transmit pin Tx, a ground pin GND, and a receive pin Rx which are respectively connected to the transmit terminal Tx, the ground terminal GND, and a receive terminal Rx provided at the other end of the cable 11. The receive pin Rx in the connector 14 is connected to the base of an NPN transistor Q3, which serves as a switching device, through a resistor R11.

The ground pin GND in the connector 14 is connected to the base of the NPN transistor Q3 through a resistor R12, and to the emitter of the NPN transistor Q3 through a resistor R13. The collector of the NPN transistor Q3 is connected to an input terminal I/P through a resistor R18, and to a positive voltage source (+5 voltage) in the hand-held PC 66 through the resistor R18 and a resistor R19 (pull-up resistor R19) which is provided for pulling a voltage up. Further, the emitter of the NPN transistor Q3 is grounded, and is connected to a node between the resistors R18 and R19 through a capacitor C1.

The transmit pin Tx in the connector 14 is connected to the drain of a P-channel FET Q4, which serves as a switching device, through a resistor R14. The source of the P-channel FET Q4 is connected to the positive voltage source (+5 volts) in the hand-held PC 66 and to its gate through a resistor R15. Further, the gate of the P-channel FET Q4 is connected to an output terminal O/P through resistors R16 and R17.

A level converting operation for transmitting data from the desktop PC 59 to the hand-held PC 66 via the cable 11 will now be described.

The desktop PC 59 outputs a low level signal (−12 volts), and the receive pin Rx in the connector 14 receives it. The signal turns the NPN transistor Q3 off and opens the transistor's output. In this case, the pull-up resistor R19 pulls a voltage up to +5 volts, and a high level signal (+5 volts) is sent to the input terminal I/P. The desktop PC 59 outputs a high level signal (+12 volts), and the receive pin Rx in the connector 14 receives it. The signal turns the NPN transistor Q3 on, and the positive voltage source (+5 volts) outputs a current to the ground through the pull-up resistor R19 and the NPN transistor Q3. The input terminal I/P receives a low level signal (0 volt).

A level converting operation for transmitting data from the hand-held PC 66 to the desktop PC 59 through the cable 11 will now be described.

The hand-held PC 66 outputs a high level signal (+5 volts) through the output terminal O/P. The signal turns the P-channel FET Q4 off and opens the transmit pin Tx in the connector 14. The receive pin RxD in the connector 12, which is connected to the transmit pin Tx in the connector 14, is connected to the negative voltage source pin RTS (−12 volts) through the pull-down register R1. The receive pin RxD receives a low level signal (−12 volts). The output terminal O/P FIG. 3 output a low level signal (0 volt), and the output signal turns the P-channel FET Q4 on. And the positive voltage source (+5 volts) supplies a voltage of +5 volts to the transmit pin Tx in the connector 14. Thus, a high level signal (+5 volts) is input to the receive pin RxD in the connector 12 which is connected to the transmit pin Tx.

As described above, the signal of −12 volts from the desktop PC 59 is converted into the signal of −5 volts, and the signal of +12 volts from the desktop PC 59 is converted into the signal of 0 volt. The level conversion on the signal for data transmission from the hand-held PC 66 is performed in the same manner, that is, the signal of +5 volts is converted into the signal of −12 volts, and the signal of 0 volt is converted into the signal of −5 volts. The desktop PC 59 can recognize the converted signals of −12 volts and +5 volts without failures because those signals satisfy the signal level standard (less than −3 volts and more than +3 volts) defined in RS-232C.

According to the above described embodiment, the level conversion circuit can be miniaturized and the manufacturing cost can be reduced. That miniaturization is achieved by excluding clamp elements such as the zener diode which are necessary for lowering a voltage in a conventional apparatus. The present invention requires no clamp element because the hand-held PC has its own incorporated level conversion circuit and drives same with a voltage of +5 volts which is supplied as a source voltage for the hand-held PC.

Moreover, the connectors can be also miniaturized because they need no circuits or substrates housed therein. This also causes the reduction of the manufacturing cost.

What is claimed is:

1. A data communications interface apparatus comprising a signal level conversion circuit interconverting signal levels of a high-power device and a low-power device in order to enable two-way data communication to be performed between said high-power device and said low-power device when said high-power device and said low-power device are connected to each other via a cable;

wherein said signal level conversion circuit comprises:
   a low-to-high power level conversion circuit which receives a signal output from the low-power device and converts a level of the received signal so as to match with an input signal level useable by the high-power device; and wherein said low-to-high power level conversion circuit comprises:
   a low power source obtaining line to which a power source is supplied from the low-power device; and
   a first switching device which is switched on when the signal received from said low-power device has a first level, and which is switched off when the signal received from said low-power device has a second level different from the first level;
   said low-to-high power level conversion circuit controlling a current obtained from said low-power source obtaining line to flow to the high-power device via said first switching device while said first switching device is switched on, thereby applying to said high-power device a signal having a voltage level which is suitable for use by said high-power device; and
   said low-to-high power level conversion circuit opening connection between said first switching device and said high-power device while said first switching device is switched off, and supplying to said high-power device a voltage which is pulled down so as to match with a negative voltage level which is receivable and useable by said high-power device.

2. The data communications interface apparatus according to claim 1, wherein said signal level conversion circuit further comprises:
   a high-to-low power level conversion circuit which receives a signal output from the high power device and converts a level of the received signal so as to match with an input signal level of the low power device; and
   wherein said high-to-low power conversion circuit comprises:
   a second switching device which is switched on when the signal received from said high-power device has a first level, and which is switched off when the signal received from said high-power device has a second level;
   said high-to-low power conversion circuit supplying a signal having a ground level from said high-power device to said low-power device via said second switching device, while said second switching device is switched on; and
   said high-to-low power conversion circuit opening connection between said second switching device and said low-power device while said second switching device is switched off, and supplying to said low-power device a voltage which is pulled up so as to match with a voltage level of said low-power device.

3. The data communications interface apparatus according to claim 1, wherein said signal level conversion circuit is mounted in a casing of said low-power device.

4. A data communications interface system comprising a data communications interface apparatus including a cable for enabling data communications to be performed between a high-power device and a low-power device, and a signal level conversion circuit which interconverts signal levels of said high-power device and said low-power device;

wherein said signal level conversion circuit comprises:
   a low-to-high power level conversion circuit which receives a signal output from the low-power device and converts a level of the received signal so as to match with an input signal level of the high-power device; and
   a high-to-low power level conversion circuit which receives a signal output from the high-power device and converts a level of the received signal so as to match with an input signal level of the low-power device;

wherein said low-to-high power level conversion circuit comprises:
   a low power source obtaining line to which a power source output from the low-power device is supplied; and
   a first switching device which is switched on when the signal received from said low-power device has a low level, and which is switched off when the signal received from said low-power device has a high level;
   said low-to-high power level conversion circuit controlling a current obtained from said low-power source obtaining line to flow via said first switching device while said first switching device is switched on, thereby applying to said high-power device a signal having a voltage level which is suitable for said low-power device, as a signal having a high level; and
   said low-to-high power level conversion circuit opening a connection between said first switching device and the high-power device while said first switching device is switched off, and supplies to the high-power device a voltage which is pulled down so as to match with a negative voltage level which is receivable by the high-power device; and wherein said high-to-low power level conversion circuit comprises:

a second switching device which is switched on when the signal received from said high-power device has a high level, and which is turned off when the signal received from said high-power device has a low level;

said high-to-low power level conversion circuit supplying a signal having a ground level from said high-power device to said low-power device via said second switching device, while said second switching device is switched on, as a signal having a low level which said low-power device can receive; and said high-to-low power level conversion circuit opening connection between said second switching device and said low-power device while said second switching device is switched off, and supplying to said low-power device a voltage which is pulled up so as to match with a voltage level of said low-power device.

* * * * *